United States Patent [19]

Dollman et al.

[11] 4,191,596

[45] Mar. 4, 1980

[54] METHOD AND COMPOSITIONS FOR COATING ALUMINUM

[75] Inventors: David Y. Dollman, Doylestown; Timothy J. O'Grady, Ambler, both of Pa.

[73] Assignee: Union Carbide Corporation, New York, N.Y.

[21] Appl. No.: 939,983

[22] Filed: Sep. 6, 1978

[51] Int. Cl.$^2$ .......................... C23F 7/00; B44D 1/36
[52] U.S. Cl. .................................. 148/6.27; 148/31.5; 260/29.6 M; 427/388 C
[58] Field of Search ........... 427/385 R, 385 B, 383 C, 427/388 R, 388 C, 398 R, 409, 419 R; 148/6, 6.15, 6.2, 6.27; 106/14; 260/29.6 M

[56] References Cited

U.S. PATENT DOCUMENTS 3,682,713  8/1972  Ries et al. ..................... 148/6.16 X
3,912,548  10/1975  Faigen ............................. 427/409 X

FOREIGN PATENT DOCUMENTS 2459573  7/1975  Fed. Rep. of Germany.

Primary Examiner—Ralph S. Kendall
Attorney, Agent, or Firm—John S. Piscitello

[57] ABSTRACT

This invention relates to a method and compositions for coating aluminum in order to improve both corrosion resistance and paint adhesion. By using a coating composition consisting essentially of (a) polyacrylic acid or esters thereof and (b) at least one acid selected from the group consisting of $H_2ZrF_6$, $H_2TiF_6$, and $H_2SiF_6$, the characteristics of the treated aluminum surfaces are improved, while process waste disposal problems associated with conventional chrome/phosphate coating are avoided.

10 Claims, No Drawings

METHOD AND COMPOSITIONS FOR COATING ALUMINUM

FIELD OF THE INVENTION

This invention pertains to aluminum coating compositions consisting essentially of (a) polyacrylic acid or esters thereof and (b) at least one acid selected from the group consisting of $H_2ZrF_6$, $H_2TiF_6$, and $H_2SiF_6$. The instant coating compositions improve corrosion resistance and paint adhesion of aluminum, particularly extruded aluminum. Also provided is a method for coating aluminum using the above-mentioned coating compositions.

BACKGROUND AND DESCRIPTION OF THE PRIOR ART

It is well known that the aesthetic desirability, corrosion resistance and paint adhesion properties of an aluminum surface may be improved by forming a chromate conversion coating by contacting the surface with an aqueous conversion coating composition containing hexavalent chromium ions, phosphate ions and fluoride ions. By way of illustration, such coatings are disclosed in U.S. Pat. Nos. 2,438,877; 2,928,763 and 3,377,212 and in British Pat. No. 891,910. However, there has been growing concern in recent years about pollution of rivers and waterways, and attention has been directed to reducing or eliminating harmful materials from the effluent of industrial processes. Hexavalent chromium can cause problems if discharged into waterways because of its strongly oxidizing character. As a result, conventional chromate conversion coating processes have required extensive waste treatment procedures to eliminate possible harmful effects resulting from the discharge of hexavalent chromium. This necessarily results in increased costs, and as a result attention has been given to developing alternative processes for improving the characteristics of aluminum surfaces which employ no hexavalent chromium.

Recently, attempts have been made to produce chromate-free coatings. By way of illustration, U.S. Pat. No. 3,682,713 discloses an aqueous aluminum coating solution containing a complex fluoride of boron, titanium, zirconium or iron and an oxidizing agent such as sodium nitrobenzene sulfonate or nitrate. As a further example, co-pending U.S. application Ser. No. 755,922 discloses an aqueous aluminum coating solution containing zirconium and/or titanium, fluoride and phosphate. However, it is desirable from an environmental standpoint to produce a coating solution that does not contain phosphates, nitrates or sulfonates. Such a coating solution is disclosed, for example, in U.S. Pat. No. 3,912,548 which discloses inter alia a metal coating solution comprising polyacrylic acid and ammonium fluozirconate.

It has now been found that novel aluminum coating compositions consisting essentially of (a) polyacrylic acid or esters thereof and (b) an acid selected from the group consisting of $H_2ZrF_6$, $H_2TiF_6$, and $H_2SiF_6$ are particularly effective in providing improved corrosion resistance and paint adhesion for the surface of the aluminum.

OBJECTS

It is an object of the present invention to provide a method and composition for the treatment of aluminum surfaces that will enhance the corrosion resistance and paint adhesion characteristics of the surface.

It is a further object of the present invention to provide a composition for coating aluminum that will avoid the waste effluent disposal problems encountered with compositions employed heretofore.

It is yet another object of the present invention to provide an inexpensive process for the coating of aluminum.

These and other objects will become apparent from a reading of the detailed specification.

SUMMARY OF THE INVENTION

This invention provides a composition for coating the surface of a metal selected from the group consisting of aluminum and alloys thereof in which aluminum is the principal ingredient, comprising an aqueous acidic solution which consists essentially of:
  (i) from about 0.5 to about 10 grams/liter of at least one polymer selected from the group consisting of polyacrylic acid and esters thereof, and
  (ii) from about 0.2 to about 8 grams/liter of at least one acid selected from the group consisting of $H_2ZrF_6$, $H_2TiF_6$ and $H_2SiF_6$,
the pH of the solution being less than about 3.5 (preferably less than 2.5).

The invention also provides a method for coating aluminum surfaces in which the surface to be coated is contacted with the aqueous composition of the invention so as to form the desired coating. After application of the coating, the aluminum surface can be dried at a temperature of from about 60° F. to about 500° F., thereby avoiding the production of process waste effluent.

It has been unexpectedly found that by using the compositions of the invention, aluminum surfaces having excellent properties in terms of corrosion resistance and paint adhesion may be obtained, notwithstanding the fact that the coating forming ingredients in the composition are chromate-free and phosphate-free.

The coatings of the present invention are useful in the production of aluminum doors and siding, coil stock, and the like.

DETAILED DESCRIPTION OF THE PREFERRED EMBODIMENTS

The essential constituents of the coating composition of the invention are (i) at least one polymer selected from the group consisting of polyacrylic acid and esters thereof and (ii) at least one acid selected from the group consisting of fluozirconic, fluotitanic and fluosilicic acids. The preferred composition within the scope of the invention is one that consists essentially of from about 1.5 to about 6 grams/liter of component (i) and from about 0.75 to about 4 grams/liter of component (ii). Although it is possible to employ salts of these acids, such as sodium, potassium and ammonium salts, such a procedure is not recommended since (a) the salts necessarily introduce additional cations into the bath which can interfere with coating formation and reduce the effectiveness of the formed coating (see Table 1, infra) and (b) when the salts are employed, it would be necessary to add a strong acid such as phosphoric or nitric acid to the salt mixture in order to obtain the required coating pH of less than about 3.5, thus producing additional anions such as nitrate or phosphate ions which, as has been stated above, are undesirable from an environmental standpoint.

Useful polymers within the scope of component (i) include water soluble as well as water dispersible polymers. In the preferred embodiment of this invention, component (i) comprises a water soluble polyacrylic acid having a molecular weight of up to about 500,000. Aqueous solutions of polyacrylic acid are available commercially, for example, as ACRYSOL A-1, ACRYSOL A-3 and ACRYSOL A-5, products of Rohm and Haas Company. Water dispersible emulsions of polyacrylic acid esters, such as the methyl, ethyl and butyl esters are also within the scope of the invention. Water dispersible emulsions of polyacrylic acid esters are available commercially, for example, as RHOPLEX AC-35, a product of Rohm and Haas Company.

The coating composition and process of this invention is useful in the formation of coatings on pure aluminum and alloys thereof including extrusions, cast, wrought and sintered alloys. Useful alloys include any alloy in which aluminum is the principal ingredient (see, for example, aluminum industry standard numbers 1100, 2014, 3004, 6061 and 7075).

The instant coating composition is an aqueous one having a pH of less than about 3.5. Tap water can be used in forming the composition, and it was found that good results were obtained using samples of tap water. Provided tap water is used, the composition pH may be affected somewhat, depending upon the nature of the tap water, and therefore a final composition pH check is in order to insure that the pH is less than about 3.5. In this regard, it is possible, although not preferred, to produce the desired acidity by introducing a strong mineral acid such as hydrochloric, sulfuric or nitric acid. In view of the sensitivity of the coating-forming ingredients to the presence of "foreign" ions, it may be preferable to use deionized water or "DI water", especially at the lower limits of the concentration levels of the coating-forming ingredients.

A fresh bath for use in accordance with the invention is easily prepared by dilution of a concentrate which includes the essential ingredients in the proper proportion. Illustrative of such an aqueous concentrate is a solution prepared from tap water containing the following ingredients in the amounts indicated:

| | |
|---|---|
| polyacrylic acid (added as ACRYSOL A-1) | 82.5 grams/liter |
| $H_2TiF_6$ | 40 grams/liter |

A typical five percent operational bath made up from such a concentrate using DI or distilled water might contain the essential ingredients in the amounts indicated below:

| | |
|---|---|
| polyacrylic acid (added as ACRYSOL A-1) | 4.13 grams/liter |
| $H_2TiF_6$ | 2.0 grams/liter |

In the method of the invention, the aluminum surfaces to be treated are contacted with the coating composition for a time and at a temperature sufficient to produce an effective coating. Suitable contact times range from about 2 to about 40 seconds or longer, preferably from about 10 to about 25 seconds. Suitable coating composition temperatures range from about 15° C. to about 65° C., preferably from about 20° C. to about 40° C. Coating application can be made at atmospheric pressure unless super- or sub-atmospheric pressure is desired for some purpose. The application of the composition to the aluminum surfaces to be treated may be effected by any suitable method known by those skilled in the art, such as, for example, immersion (dipping), spraying and roller coating. Once application of the coating composition to the aluminum surface has begun, the components of the original bath will begin to deplete.

In a continuous coating operation, it is important to properly replenish the solution in order to maintain the effectiveness of the coating process. Work done in connection with the development of the present invention has shown that the ingredients comprising the solution are depleted as a result of reactions which occur during the formation of the coating. Available fluoride is consumed as a result of complexing with aluminum (i.e., a "used" coating bath may contain from about 0.005 to about 20 grams/liter or higher of aluminum ion), and hydrogen is consumed as the aluminum surface is coated. In addition, ingredients are depleted as a result of drag-out of the solution on the aluminum surface. Other work shows that the rate of depletion of ingredients is related to the shape of the surface being coated and the manner in which the coating solution is contacted with the aluminum surface. For example, when spraying cans, there is a greater drag-out loss than when spraying strip.

The coating solution can be replenished as the ingredients are depleted. This may be accomplished by either monitoring the amount of each ingredient in the coating solution and adding this ingredient as it is depleted or it can be accomplished by adding thereto an aqueous concentrate of the ingredients.

The replenishing ingredients should be added to the solution to maintain the ingredients thereof in effective operating amounts. In an application in which there is a buildup of aluminum in the coating solution, it is recommended that the replenishing composition contain a relatively high proportion of fluoride for complexing the aluminum. The preferred source of free fluoride is HF. The following is a typical aqueous concentrate for replenishing the coating solution:

| | |
|---|---|
| polyacrylic acid | 75 grams/liter |
| $H_2TiF_6$ | 75 grams/liter |
| HF | 50 grams/liter |

For replenishment purposes, useful aqueous concentrate compositions would be those consisting essentially of:
(A) from about 25 to about 100 grams/liter of at least one polymer selected from the group consisting of polyacrylic acid and esters thereof,
(B) from about 25 to about 100 grams/liter of an acid selected from the group consisting of $H_2ZrF_6$, $H_2TiF_6$ and $H_2SiF_6$, and
(C) a material (preferably HF) which is a source of about 17 to about 120 grams/liter of free fluoride.

The following examples are illustrative of, but are not intended to limit, the present invention.

EXPERIMENTAL

The following experimental description illustrates the present invention.

EXAMPLES 1 to 4

Several coating solutions were prepared using polyacrylic acid ("ACRYSOL A-1") and $H_2ZrF_6$ (Example 1), $H_2TiF_6$ (Examples 2 and 3), or $H_2SiF_6$ (Example 4), in the amounts specified in Table 1 below. The formulations of Comparisons B and C were prepared using only polyacrylic acid in amounts of 4.11 grams/liter (Comparison B) and 2.05 grams/liter (Comparison C). In addition, a comparative formulation was prepared using polyacrylic acid and ammonium fluozirconate (Comparison D—see Table 1). All formulations were made up using tap water.

Panels of aluminum extrusion measuring 0.1 inches×3 inches × 12 inches were cleaned with a mild alkaline phosphate cleaner. They were then spray-coated on both sides with the above-described coating solutions. The panels were dried without rinsing and then heated in a warm air oven at 190° F. for 5 minutes. After cooling to room temperature, the panels were spray-painted with "metallic" bronze paint. (Note that Comparison A is a control which was not spray-coated prior to painting). The painted panels were then baked in a hot air oven for 20 minutes at 300° F.

The painted panels were tested using the test methods given in Table A below. The test results are given in Table 1 which follows.

TABLE A

| Test | Adhesion Test Methods | |
|---|---|---|
| | AAMA* Method | ASTM Method |
| Detergent, 72 hour | 6.6.3.1 | |
| Salt Spray, 1000 hour | 6.7.2.1 | B-117-73 |
| Cross Hatch (Film Adhesion) | | |
| Dry | 6.4.1.1 | |
| | 6.4.1.2 | |
| Humidity, 1000 hour | 6.7.1 | D-2247-68 |
| Bend, 180° | A test for paint loss when a painted panel is bent back on itself to form a sharp crease. Visual observation is made of the extent of paint loss that results on the outside surface of the crease. | |

TABLE A-continued

| Test | Adhesion Test Methods | |
|---|---|---|
| | AAMA* Method | ASTM Method |
| Boil, 20 minute | Painted test panels are placed in boiling tap water for 20 minutes. The panels are dried, and then a strip of "3M" (#610) tape is applied over the painted area and pressed firmly onto the metal. The tape was then rapidly peeled off in order to determine the extent of paint removal from the metal surface. | |
| Pucker | A few drops of a paint stripper (ENSIGN EPOXY STRIPPER 803, a product of Ensign Products, Cleveland) are placed on a painted test panel. Visual observation is made of the time it takes for the paint to "pucker". | |

*Architectural Aluminum Manufacturers Association

TABLE 1

| Comparison/Example | A | B | C | D | 1 | 2 | 3 | 4 |
|---|---|---|---|---|---|---|---|---|
| Formulation[1] | | | | | | | | |
| Polyacrylic acid[2] | — | 4.11 | 2.05 | 2.67 | 4.11 | 4.11 | 2.05 | 4.11 |
| $(NH_4)_2ZrF_6$ | — | — | — | 1.66 | — | — | — | — |
| $H_2ZrF_6$[3] | — | — | — | — | 1.23 | — | — | — |
| $H_2TiF_6$ | — | — | — | — | — | 1.942 | 0.971 | — |
| $H_2SiF_6$ | — | — | — | — | — | — | — | 0.85 |
| Metal Ion (grams/liter) | — | — | — | 0.730 | 0.540 | 0.567 | 0.284 | 0.166 |
| Solution pH | — | 2.8 | 3.02 | ~3.9 | ~2.1 | ~2.1 | ~2.2 | ~2.1 |
| Adhesion Tests[4] | | | | | | | | |
| Bend, 180° | 100% loss | 10% loss | 20% loss | no loss | trace loss | no loss | no loss | trace loss |
| Detergent, 72 hr. | Failed slight loss | Failed excessive loss | Failed moderate loss | failed - excessive loss | no loss | no loss | no loss | no loss |
| Salt Spray, 1000 hr. | NR[5] | pass - field blisters | pass - field blisters | NR | pass | pass | pass | pass - medium field blisters |
| Pucker | paint loss after 21 seconds | paint loss after 35 seconds | paint loss after 35 seconds | paint loss after 90 seconds | no loss after 10 minutes | no loss after 10 minutes | no loss after 10 minutes | no loss after 10 minutes |
| Cross Hatch | | | | | | | | |
| Wet | Failed excessive loss | Failed slight loss | Failed moderate loss | NR | no loss | no loss | no loss | no loss |
| Dry | No Loss | No Loss | No Loss | NR | no loss | no loss | no loss | no loss |

[1] Amounts are given in grams per liter of aqueous solution.
[2] Added as "ACRYSOL A-1", a product of Rohm and Haas Company.
[3] Prepared by mixing one mole of $ZrF_4$ with two moles of HF.
[4] Conducted using metallic bronze paint.
[5] "NR" denotes that the test in question was not performed (i.e., "not run").

The results as presented in Table 1 clearly show the improved results that are obtainable using the coating solutions of the instant invention as compared to conventional coating solutions. Comparisons B and C (polyacrylic acid only) provided field blisters in the salt spray test and provided paint loss in the pucker test after 35 seconds, and provided 10% and 20% paint loss, respectively, in the 180° bend test. Comparison D, which employed a formulation of polyacrylic acid and ammonium fluozirconate, failed the 72 hour detergent test and provided paint loss after 90 seconds in the pucker test. The control (Comparison A) showed poor results in each test. In contrast, the formulations of Examples 1 to 3 provided excellent results in all tests. The formulation of Example 4 performed well in all tests, although it provided medium field blisters in the salt spray test.

EXAMPLES 5 to 7

Plant site tests were performed on 16 foot aluminum panel extrusions (door frames) using the formulations given in Table 2. The panels were dipped for 30 seconds into a 16 foot trough, dried and spray-painted with either a white or black top coat.

The panels were later tested in accordance with the testing procedures of Table A. The results, which are given in Table 2, show excellent performance by polyacrylic acid in combination with either $H_2TiF_6$ (Examples 5 and 6) or $H_2SiF_6$ (Example 7). As a comparison, a formulation consisting of polyacrylic acid, $HNO_3$ and $(NH_4)_2ZrF_6$ provided comparably good results.

TABLE 2

| Comparison/ | Field Tests | | | |
|---|---|---|---|---|
| Example | 5 | 6 | 7 | E |
| Formulation[1] | | | | |
| polyacrylic acid[2] | 4.11 | 2.05 | 4.11 | 4.11 |
| $H_2TiF_6$ | 1.942 | 0.971 | — | — |
| $H_2SiF_6$ | — | — | 1.7 | — |
| $ZrF_6^=$ plus $H^+$[3] | — | — | — | 2.45 |
| Metal Ion (grams/liter) | 0.567 | 0.284 | 0.331 | 1.08 |
| Solution pH | 2.04 | 2.16 | 2.24 | 2.5 |
| Adhesion Tests[4] | | | | |
| Humidity, 1000 hr. | no loss | no loss | no loss | no loss |
| Salt Spray, 1000 hr. | slight field blisters | no loss | no loss | no loss |
| Boil, 20 minutes | no loss | no loss | no loss | no loss |
| Pucker | no loss after 10 minutes | no loss after 10 minutes | no loss after 10 minutes | no loss after 10 minutes |

[1] Amounts are given in grams per liter of total aqueous solution.
[2] Added as "ACRYSOL A-1", a product of Rohm and Haas Company.
[3] Prepared by mixing one mole of $(NH_4)_2ZrF_6$ and 2 moles of $HNO_3$.
[4] Conducted using while paint for Examples 5 and 6; black paint for Example 7. Identical results were achieved using white paint and black paint for Comparison E.

What is claimed is:

1. An aqueous acidic solution for coating the surface of a metal selected from the group consisting of aluminum and alloys thereof in which aluminum is the principal ingredient, which consists essentially of:
   (i) from about 0.5 to about 10 grams/liter of at least one polymer selected from the group consisting of polyacrylic acid and esters thereof, and
   (ii) from about 0.2 to about 8 grams/liter of at least one acid selected from the group consisting of $H_2ZrF_6$, $H_2TiF_6$ and $H_2SiF_6$,
   the pH of the solution being less than about 3.5.

2. The solution as claimed in claim 1 wherein component (i) is polyacrylic acid and component (ii) is $H_2ZrF_6$.

3. The solution as claimed in claim 1 wherein component (i) is polyacrylic acid and component (ii) is $H_2TiF_6$.

4. The solution as claimed in claim 1 wherein component (i) is polyacrylic acid and component (ii) is $H_2SiF_6$.

5. A process for coating the surface of a metal selected from the group consisting of aluminum and alloys thereof in which aluminum is the principal ingredient, which comprises the step of contacting the surface of said metal with an aqueous acidic solution consisting essentially of:
   (i) from about 0.5 to about 10 grams/liter of at least one polymer selected from the group consisting of polyacrylic acid and esters thereof, and
   (ii) from about 0.2 to about 8 grams/liter of at least one acid selected from the group consisting of $H_2ZrF_6$, $H_2TiF_6$ and $H_2SiF_6$,
   the pH of the solution being less than about 3.5.

6. The coated metal produced by the process of claim 5.

7. The process of claim 5 which comprises the further step of drying said surface of said metal at a temperature of from about 60° F. to about 500° F.

8. The coated metal produced by the process of claim 7.

9. An aqueous concentrate composition consisting essentially of:
   (A) from about 25 to about 100 grams/liter of at least one polymer selected from the group consisting of polyacrylic acid and esters thereof,
   (B) from about 25 to about 100 grams/liter of an acid selected from the group consisting of $H_2ZrF_6$, $H_2TiF_6$ and $H_2SiF_6$, and
   (C) a material which is a source of about 17 to about 120 grams/liter of free fluoride.

10. The composition of claim 9 wherein said material which is a source of free fluoride is HF.

* * * * *

UNITED STATES PATENT AND TRADEMARK OFFICE
CERTIFICATE OF CORRECTION

PATENT NO. : 4,191,596

DATED : March 4, 1980

INVENTOR(S) : David Y. Dollman and Timothy J. O'Grady

It is certified that error appears in the above-identified patent and that said Letters Patent are hereby corrected as shown below:

Column 5, in Table A under heading "Test" and below "Dry", delete "6.4.1.2" and read --Wet--.

Column 5, in Table A, under heading "AAMA* Method", under "6.4.1.1", read --6.4.1.2--.

On the cover page of the patent, in the lines identified by "[73] Assignee:", for "Union Carbide Corporation, New York, N.Y." read --Amchem Products, Inc., Ambler, Pa.--.

Signed and Sealed this

Twenty-third Day of September 1980

[SEAL]

Attest:

SIDNEY A. DIAMOND

Attesting Officer

Commissioner of Patents and Trademarks

REEXAMINATION CERTIFICATE (1311th)

United States Patent [19]

Dollman et al.

[11] B1 4,191,596

[45] Certificate Issued  Jun. 26, 1990

[54] METHOD AND COMPOSITIONS FOR COATING ALUMINUM

[75] Inventors: David Y. Dollman, Doylestown; Timothy J. O'Grady, Ambler, both of Pa.

[73] Assignee: Amchem Products, Inc.

Reexamination Request:
No. 90/001,690, Jan. 13, 1989

Reexamination Certificate for:
Patent No.: 4,191,596
Issued: Mar. 4, 1980
Appl. No.: 939,983
Filed: Sep. 6, 1978

Certificate of Correction issued Sep. 23, 1980.

[51] Int. Cl.$^5$ ............................................. C23C 22/56
[52] U.S. Cl. .................................. 148/247; 148/251; 428/450

[56] References Cited

U.S. PATENT DOCUMENTS

| | | |
|---|---|---|
| 2,161,319 | 6/1939 | Schamberger . |
| 2,438,877 | 9/1945 | Spruance . |
| 2,758,102 | 8/1956 | Grummitt . |
| 2,773,850 | 12/1956 | Willis . |
| 2,902,939 | 9/1959 | Bell . |
| 3,076,734 | 2/1963 | Schimkus . |
| 3,079,358 | 2/1963 | Uelzmann . |
| 3,185,596 | 5/1965 | Schiffman . |
| 3,519,495 | 7/1970 | Plaxton . |
| 3,682,713 | 8/1972 | Ries . |
| 3,850,732 | 11/1974 | Binns . |
| 3,865,617 | 2/1975 | Shimizu . |
| 3,912,548 | 10/1975 | Faigen . |
| 3,964,936 | 6/1976 | Das . |
| 4,136,073 | 1/1979 | Muro . |

FOREIGN PATENT DOCUMENTS

| | | |
|---|---|---|
| 2459573 | 7/1975 | Fed. Rep. of Germany . |
| 2704260 | 3/1978 | Fed. Rep. of Germany . |
| 5173938 | 2/1971 | Japan . |
| 51-45604 | 12/1976 | Japan . |

OTHER PUBLICATIONS

Farnworth, et al., "Production, Properties and Uses of Zirconium", (1980) Royal Chemical Society Special Pub. No. 40, (U.K.) pp. 248–284.

*Primary Examiner*—Sam Silverberg

[57] ABSTRACT

This invention relates to a method and compositions for coating aluminum in order to improve both corrosion resistance and paint adhesion. By using a coating composition consisting essentially of (a) polyacrylic acid or esters thereof and (b) at least one acid selected from the group consisting of $H_2ZrF_6$, $H_2TiF_6$, and $H_2SiF_6$, the characteristics of the treated aluminum surfaces are improved, while process waste disposal problems associated with conventional chrome/phosphate coating are avoided.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 3, 4 and 6–10 are cancelled.

Claims 1 and 5 are determined to be patentable as amended.

Claim 2 dependent on an amended claim, is determined to be patentable.

New claims 11 and 12 are added and determined to be patentable.

1. An aqueous acidic solution for coating the surface of a metal selected from the group consisting of aluminum and alloys thereof in which aluminum is the principle ingredient, which consists essentially of:
   (i) from about 0.5 to about 10 grams/liter of at least one polymer selected from the group consisting of polyacrylic acid and esters thereof, and
   (ii) from about 0.2 to about 8 grams/liter of [at least one acid selected from the group consisting of] $H_2ZrF_6$, [$H_2TiF_6$ and $H_2SiF_6$,]
   the pH of the solution being less than about 3.5.

5. A process for coating the surface of a metal selected from the group consisting of aluminum and alloys thereof in which aluminum is the principal ingredient, which comprises the step of contacting the surface of said metal with an aqueous acidic solution consisting essentially of:
   (i) from about 0.5 to about 10 grams/liter of at least one polymer selected from the group consisting of polyacrylic acid and esters thereof, and
   (ii) from about 0.2 to about 8 grams/liter of at least one acid selected from the group consisting of $H_2ZrF_6$, $H_2TiF_6$ and $H_2SiF_6$,
   the pH of the solution being less than about 3.5, *and drying said surface without rinsing.*

*11. The process of claim 5, wherein component (i) is polyacrylic acid; and component (ii) is $H_2ZrF_6$ and said drying of said metal is at a temperature of from about 60° F. to about 500° F.*

*12. The process of claim 5 which comprises the further step of painting said coated surface of said metal.*

* * * * *